United States Patent
Moro et al.

(10) Patent No.: US 7,922,588 B2
(45) Date of Patent: Apr. 12, 2011

(54) STORAGE MEDIUM HAVING GAME PROGRAM STORED THEREON AND GAME APPARATUS

(75) Inventors: Isao Moro, Kyoto (JP); Toshinori Kawai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1244 days.

(21) Appl. No.: 11/521,374

(22) Filed: Sep. 15, 2006

(65) Prior Publication Data
US 2007/0111803 A1 May 17, 2007

(30) Foreign Application Priority Data

Nov. 11, 2005 (JP) .................................. 2005-327709

(51) Int. Cl.
*G06F 17/00* (2006.01)

(52) U.S. Cl. .......................................................... 463/43

(58) Field of Classification Search .................. 463/7–9, 463/30, 36–43, 49–57; 273/148 B, 148 R, 273/309, 317.1, 340, 348, 361–367, 108.1, 273/127 R, 461; 345/686, 949, 950
See application file for complete search history.

(56) References Cited

U.S. PATENT DOCUMENTS

| 6,256,047 | B1 * | 7/2001 | Isobe et al. | 345/473 |
| 7,716,008 | B2 * | 5/2010 | Ohta | 702/152 |
| 2002/0016194 | A1 | 2/2002 | Namba et al. | |
| 2006/0128468 | A1 * | 6/2006 | Yoshikawa et al. | 463/36 |
| 2007/0024597 | A1 * | 2/2007 | Matsuoka | 345/173 |
| 2007/0075985 | A1 * | 4/2007 | Niida | 345/173 |
| 2007/0078004 | A1 * | 4/2007 | Suzuki et al. | 463/43 |
| 2007/0270218 | A1 * | 11/2007 | Yoshida et al. | 463/37 |

FOREIGN PATENT DOCUMENTS

| JP | 2001-062145 | 3/2001 |
| JP | 2001-125552 | 5/2001 |
| JP | A-2002-939 | 1/2002 |
| JP | 2002-45569 | 2/2002 |

* cited by examiner

*Primary Examiner* — Ronald Laneau
(74) *Attorney, Agent, or Firm* — Nixon & Vanderhye P.C.

(57) ABSTRACT

Designated coordinates, on the display screen, designated by the pointing device are acquired, and target coordinates, in the virtual game space, corresponding to the designated coordinates are calculated. A distance from reference coordinates set on the display screen to the designated coordinates is calculated and speed information based on the distance is calculated. A predetermined object is moved toward the target coordinates in the virtual game space at a movement speed represented by the speed information.

18 Claims, 13 Drawing Sheets

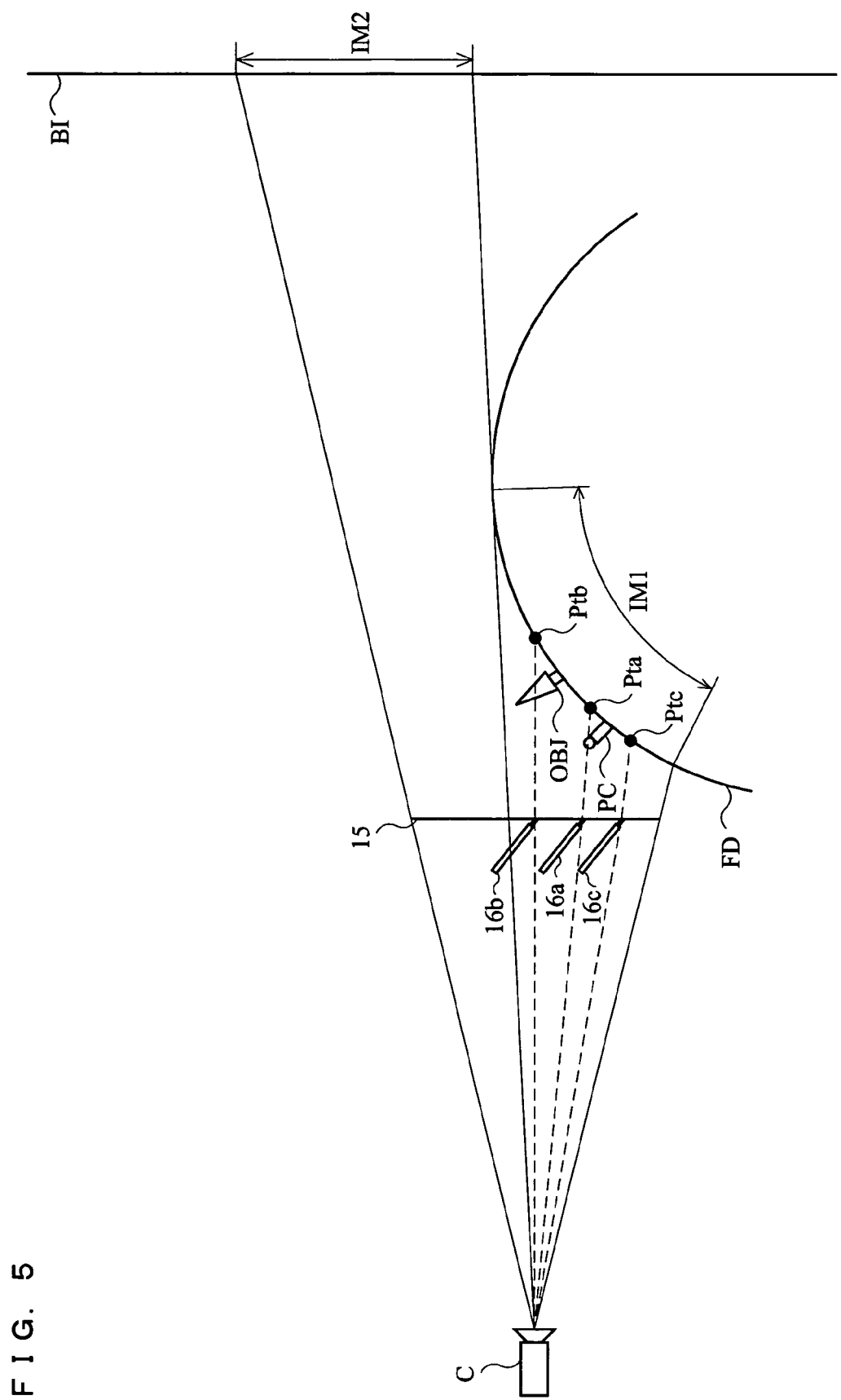
F I G. 5

F I G. 1 1
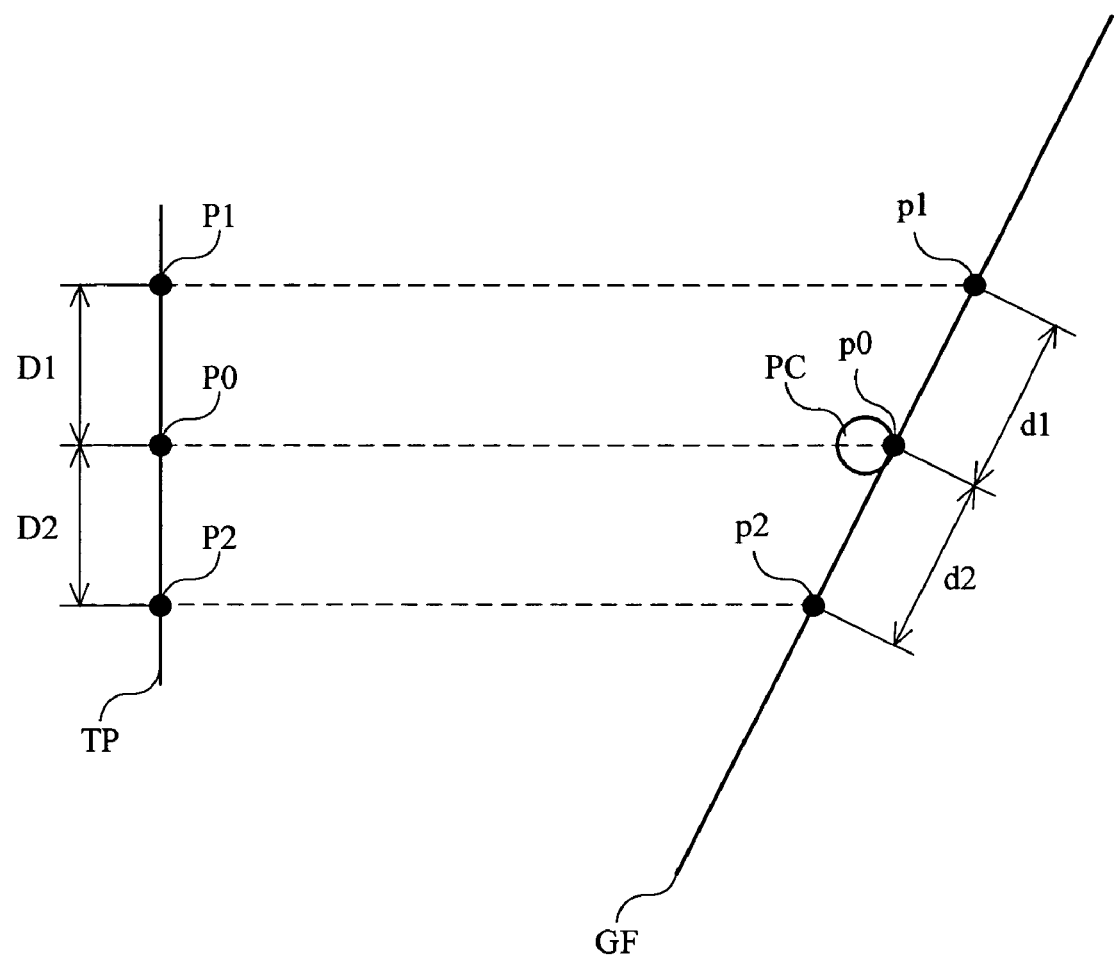

F I G. 1 3
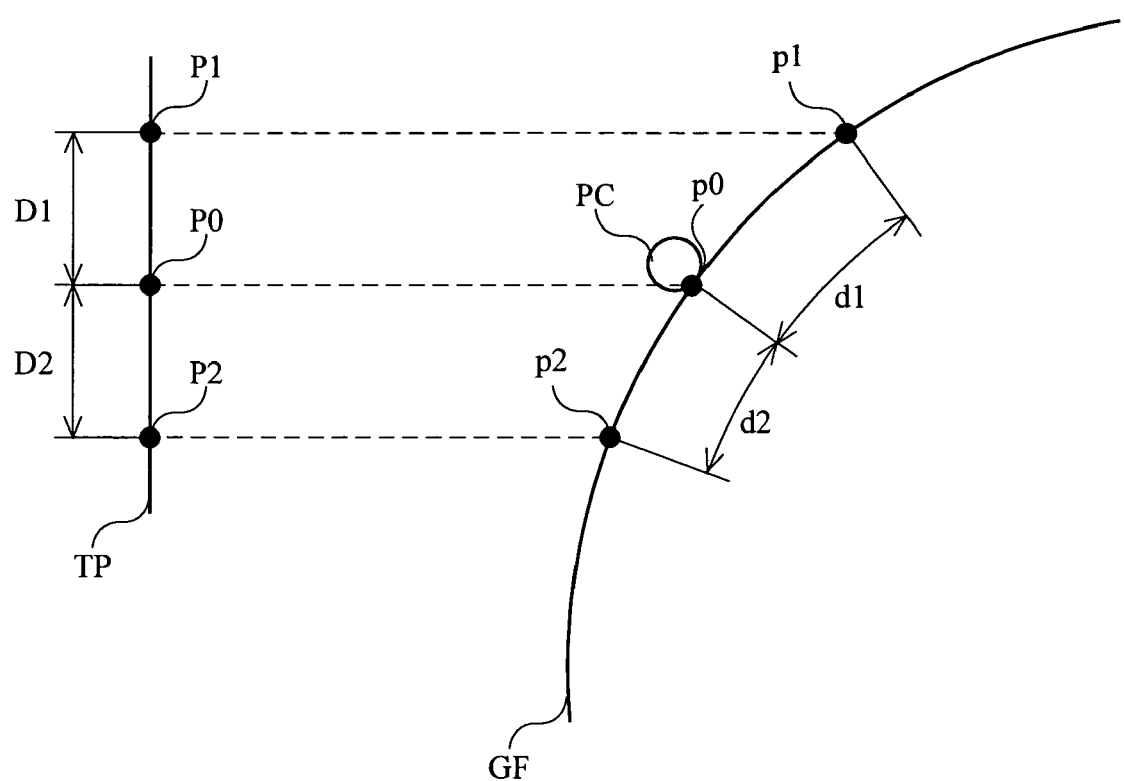

STORAGE MEDIUM HAVING GAME PROGRAM STORED THEREON AND GAME APPARATUS

CROSS REFERENCE TO RELATED APPLICATION

The disclosure of Japanese Patent Application No. 2005-327709 is incorporated herein by reference.

TECHNICAL FIELD

The present invention relates to a storage medium having a game program stored thereon and a game apparatus, and more particularly to a storage medium having stored thereon a game program executed by a game apparatus which allows an input to be made using a pointing device such as a touch panel, and a game apparatus.

BACKGROUND AND SUMMARY

Conventionally, widespread is a game apparatus for allowing a player to enjoy a game by controlling a player object displayed on a game screen. For example, as disclosed in Japanese Laid-Open Patent Publication No. 2002-939 (hereinafter, referred to as Patent Document 1), a state where a player object is disposed on a plane game field in a virtual game space is picked up by a virtual camera so as to represent the state in an image, thereby generating a game screen.

When the game apparatus disclosed in Patent Document 1 is used, a player makes an input using a pointing device such as a touch panel. The game apparatus detects for a touch position at which the player touches the touch panel provided over a display screen for displaying the game screen, and subjects, to some change, a game object to be displayed on the display screen in accordance with the touch position, thereby representing the game. When the touch panel as disclosed in Patent Document 1 is used, the game screen is directly controlled so as to subject the game object to some change. Therefore, the player can directly control the object so as to develop the game on the screen, whereby the player can increasingly enjoy the game, and easily and accurately control the game.

A game which allows a player to control an object appearing in a two-dimensional virtual game world has been conventionally predominant. However, since performance of a computer has been significantly improved, a game which allows a player to control an object appearing in a three-dimensional virtual game space has become predominant in recent years. For example, when a method used for an exemplary RPG as disclosed in Patent Document 1 is used to control an object appearing in a three-dimensional virtual game space, a vector connecting between predetermined coordinates, representing a position of a player object or the like, in a virtual game space, and coordinates, on a game field in the virtual game space, calculated in accordance with touch coordinates is obtained. Thus, the player object is moved in accordance with a magnitude and a direction of the vector.

FIG. 10 is a side view illustrating an exemplary state where a touch panel TP is set in a virtual game space when a game image is rendered such that a plane game field GF in the virtual game space, on which a character PC to be operated is disposed, is vertically viewed from above. FIG. 11 is a side view illustrating an exemplary state where a touch panel TP is set in a virtual game space when a game image is rendered such that a plane game field GF in the virtual game space, on which a character PC to be operated is disposed, is diagonally viewed from above. That is, FIGS. 10 and 11 each shows a state where an image of the character PC to be operated on the plane game field GF is rendered through the touch panel TP attached over the display device on which the virtual game space is represented.

As shown in FIGS. 10 and 11, the virtual game space is rendered in the game image using an orthogonal projection (parallel projection) through the touch panel TP having center coordinates P0 set thereon, and the character PC to be operated is disposed at a position on which the center coordinates P0 are superimposed. At this time, a position, represented by the center coordinates P0, at which a player touches the touch panel TP corresponds to a position represented by coordinates p0 on the game field GF. A position represented by coordinates P1, apart from the center coordinates P0 over a distance D1, at which the player touches the touch panel TP corresponds to a position represented by coordinates p1 on the game field GF. A position represented by coordinates P2, apart from the center coordinates P0 over a distance D2, at which the player touches the touch panel TP corresponds to a position represented by coordinates p2 on the game field GF. Further, a distance between the coordinates p0 and the coordinates p1 is represented by d1, and a distance between the coordinates p0 and the coordinates p2 is represented by d2.

Thus, in a case where the game field GF is a plane, when the distance D1 and the distance D2, which are obtained by the player touch-operating the touch panel TP in the same direction (for example, the forward to backward direction in FIGS. 10 and 11), are equal to each other, the distance d1 is equal to the distance d2. That is, a distance between coordinates, on the game field GF, at which the character PC to be operated is positioned and coordinates, on the game field GF, corresponding to touch coordinates is proportional to a distance between the center coordinates P0 (that is, the position on which the character PC to be operated is superimposed) on the touch panel TP and the touch coordinates. Therefore, for example, when a movement speed of the character PC to be operated is controlled using the distance between coordinates, on the game field GF, at which the character PC to be operated is positioned and the coordinates, on the game field GF, corresponding to the touch coordinates, the movement speed of the character PC to be operated can be determined so as to be proportional to the distance between predetermined coordinates, on the touch panel TP, representing a position of a player object or the like and the touch coordinates.

However, the game field GF including a plurality of planes each having a different inclination or the game field GF of a curved surface may be set in the virtual game space. FIG. 12 is a side view illustrating an exemplary state where the touch panel TP is set in a virtual game space when a game image is rendered such that the character PC to be operated, on the game field GF of two planes each having a different inclination, is diagonally viewed from above. FIG. 13 is a side view illustrating an exemplary state where the touch panel TP is set in the virtual game space when a game image is rendered such that the character PC to be operated, on the game field GF of a curved surface, is diagonally viewed from above. That is, FIGS. 12 and 13 each shows a state where an image of the character PC to be operated, on the game field GF of a plurality of planes each having a different inclination or the game field GF of a curved surface, is rendered through the touch panel TP attached over the display device on which the virtual game space is represented.

As shown in FIGS. 12 and 13, the virtual game space is rendered in the game image using an orthogonal projection through the touch panel TP having center coordinates P0 set thereon, and the character PC to be operated is disposed at a position on which the center coordinates P0 are superimposed. At this time, a position represented by the center coordinates P0 at which a player touches the touch panel TP corresponds to a position represented by coordinates p0 on the game field GF. A position represented by coordinates P1, apart from the center coordinates P0 over a distance D1, at which the player touches the touch panel TP corresponds to a position represented by coordinates p1 on the game field GF. A position represented by coordinates P2, apart from the center coordinates P0 over a distance D2, at which the player touches the touch panel TP corresponds to a position represented by coordinates p2 on the game field GF. In this case, a distance between the coordinates p0 and the coordinates p1 is represented by d1, and a distance between the coordinates p0 and the coordinates p2 is represented by d2.

In a case where the game field GF is not formed by a single plane, even when the distance D1 is equal to the distance D2, the distance d1 is not necessarily equal to the distance d2. The same can be said for the case where the distance D1 and the distance D2 are obtained by a player touch-operating the touch panel TP in the same direction (for example, in the forward to backward direction in FIGS. 12 and 13). That is, a distance between coordinates, on the game field GF, representing a position of the character PC to be operated and coordinates, on the game field GF, corresponding to the touch coordinates is not proportional to a distance between the center coordinates P0 (that is, the position on which the character PC to be operated is superimposed) on the touch panel TP and the touch coordinates. Therefore, for example, when a movement speed of the character PC to be operated is controlled using the distance between coordinates, on the game field GF, representing the position of the character PC to be operated and the coordinates, on the game field GF, corresponding to the touch coordinates, the movement speed of the character PC to be operated may vary even when a distance obtained by touch-operating the touch panel TP is constant. This is because the distance between predetermined coordinates, on the touch panel TP, representing a position of the player object or the like and the touch coordinates is not physically proportional to the distance between coordinates, on the game field GF, representing the position of the character PC to be operated and the coordinates, on the game field GF, corresponding to the touch coordinates.

In a case where, for example, the movement speed of the character PC to be operated is determined based on the distance between position coordinates of the character PC to be operated and coordinate, on the game field GF, corresponding to the touch coordinates, even when a distance obtained by touch-operating the touch panel TP is physically constant, a distance corresponding to the physically constant distance may vary in the virtual game space depending on a shape of the game field GF. Specifically, as shown in FIGS. 10 and 11, the distance between the center coordinates P0 on the touch panel TP and the touch coordinates is proportional to the distance between the position coordinates of the character PC to be operated and the coordinates, on the game field GF, corresponding to the touch coordinates (however, in FIG. 11, the two distances are proportional to each other only when the touch-operation is performed in the same direction such as a forward direction or a backward direction), so that a desired movement speed can be always obtained when the player makes an input at such a position, on the touch panel TP, as to move, over a desired distance, the character PC to be operated. However, in manners shown in FIGS. 12 and 13, the distance between the center coordinates P0 on the touch panel TP and the touch coordinates is not proportional to the distance between the position coordinates of the character PC to be operated and the coordinates, on the game field GF, corresponding to the touch coordinates, so that a desired movement speed may not be necessarily obtained even when the player touch-operates the touch panel TP at such a position as to move, over a desired distance, the character PC to be operated. For example, as shown in FIGS. 12 and 13, while the distance D1=the distance D2 is satisfied, the distance d1 is longer than the distance d2. Therefore, a movement speed based on the touch coordinates P2 is lower than a movement speed based on the touch coordinates P1. As a result, a player may feel that a movement speed of the character PC to be operated cannot be obtained in accordance with the player touch-operating the touch panel TP, which may dissatisfy the player. This phenomenon often occurs in the game field GF, in the virtual game space, which is not formed by a single plane. The same can be said for the case where a game image of the virtual game space is rendered using perspective projection (far-to-near projection) from a viewpoint of a virtual camera. Therefore, the player is required to play a game in consideration of the inclination of the game field GF to the touch panel TP (that is, a depth dimension of the game field GF represented in a game image).

Therefore, a feature of the present invention is to provide a storage medium having stored thereon a game program and a game apparatus for allowing a player to play a game using a pointing device such as a touch panel for detecting for a position on a display screen, and preventing the player from feeling dissatisfied with a game play.

The present invention has the following features. The reference numerals, step numbers (a step is abbreviated as S and only a step number is indicated), and the like in the parentheses indicate the correspondence with the embodiment described below in order to aid in understanding the present invention and are not intended to be limiting in any way.

A first aspect of the present invention is directed to a storage medium having stored thereon a game program to be executed by a computer (21) of a game apparatus (1) which displays on a display screen (12) a game image representing at least a portion of a virtual game space, and which is operated using a pointing device (15) for detecting for a position, on the display screen, designated by a player. The game program causes the computer to execute: a designated coordinate acquisition step (S51); a target coordinate calculation step (S52); a distance calculation step (S54); a speed information calculation step (S54); and an object movement step (S59 to S61). The designated coordinate acquisition step acquires designated coordinates (TP), on the display screen, designated by the pointing device, and stores the designated coordinates in a memory (24). The target coordinate calculation step calculates target coordinates (Pt), in the virtual game space, corresponding to the designated coordinates, and stores the target coordinates in the memory. The distance calculation step calculates a distance (D) from reference coordinates (P0) set on the display screen to the designated coordinates. The speed information calculation step calculates speed information (Vt) using the distance. The object movement step moves a predetermined object (PC) toward the target coordinates in the virtual game space at a movement speed represented by the speed information. The pointing device is an input device for designating an input position or coordinates on the display screen, and includes a touch panel, a mouse, a track pad, and a track ball. A coordinate system used for each of the input devices is, for example, a touch panel coordinate system or a screen coordinate system.

In a second aspect based on the first aspect, the game program causes the computer to further execute a reference coordinate setting step (S53). The reference coordinate setting step sets, as the reference coordinates, a position, on the display screen, which is superimposed on a position (Ppc) at which an object to be operated by the player is displayed, and stores the reference coordinates in the memory.

In a third aspect based on the first aspect, a position of the reference coordinates is fixed as a center position of the display screen.

In a fourth aspect based on the first aspect, the target coordinate calculation step calculates, as the target coordinates, a position which is on a game field (FD) set in the virtual game space and on which the designated coordinates on the display screen are superimposed.

In a fifth aspect based on the first aspect, the speed information calculation step calculates a target speed of the object, using a predetermined function, as the speed information calculated from the distance (FIG. 9).

In a sixth aspect based on the fifth aspect, the speed information calculation step sets the target speed corresponding to the distance having a value greater than a first threshold value (D2), so as to have a constant value of a maximum target speed (Vtmax).

In a seventh aspect based on the fifth aspect, the speed information calculation step sets, when the distance has a value smaller than a second threshold value (D1), the target speed to zero.

In an eighth aspect based on the first aspect, the pointing device is a touch panel attached to the display screen.

A ninth aspect of the present invention is directed to a game apparatus which displays on a display screen a game image representing at least a portion of a virtual game space, and which is operated using a pointing device for detecting for a position, on the display screen, designated by a player. The game apparatus comprises: storage means; designated coordinate acquisition means; distance calculation means; target coordinate calculation means; speed information calculation means; and object movement means. The designated coordinate acquisition means acquires designated coordinates, on the display screen, designated by the pointing device, and stores the designated coordinates in the storage means. The distance calculation means calculates a distance from reference coordinates set on the display screen to the designated coordinates. The target coordinate calculation means calculates target coordinates, in the virtual game space, corresponding to the designated coordinates, and stores the target coordinates in the storage means. The speed information calculation means calculates speed information using the distance. The object movement means moves a predetermined object toward the target coordinates in the virtual game space at a movement speed represented by the speed information.

In a tenth aspect based on the ninth aspect, reference coordinate setting means is further provided. The reference coordinate setting means sets, as the reference coordinates, a position, on the display screen, which is superimposed on a position at which an object to be operated by the player is displayed, and stores the reference coordinates in the storage means.

In an eleventh aspect based on the ninth aspect, a position of the reference coordinates is fixed as a center position of the display screen.

In a twelfth aspect based on the ninth aspect, the target coordinate calculation means calculates, as the target coordinates, a position which is on a game field set in the virtual game space and on which the designated coordinates on the display screen are superimposed.

In a thirteenth aspect based on the ninth aspect, the speed information calculation means calculates a target speed of the object, using a predetermined function, as the speed information calculated from the distance.

In a fourteenth aspect based on the thirteenth aspect, the speed information calculation means sets the target speed corresponding to the distance having a value greater than a first threshold value, so as to have a constant value of a maximum target speed.

In a fifteenth aspect based on the thirteenth aspect, the speed information calculation means sets, when the distance has a value smaller than a second threshold value, the target speed to zero.

In a sixteenth aspect based on the ninth aspect, the pointing device is a touch panel attached to the display screen.

According to the first aspect, when the pointing device is used to move the object in the virtual game space, the movement speed is set to a value calculated from the distance between the reference coordinates and the designated coordinates on the display screen, and a moving direction is determined in accordance with the target coordinates, in the virtual game space, corresponding to the designated coordinates. That is, the movement speed can be determined in accordance with a physical distance, on the display screen, which is not influenced by a shape or an inclination of a game field in the virtual game space. Therefore, when the player designates, by using the pointing device, such a position as to input a desired distance, a desired movement speed is obtained. For example, when an operation performed by a joy stick is emulated, the inclination (angle of inclination) of the joy stick is determined in accordance with a physical distance based on the operation performed on the pointing device, and a direction toward which the joy stick is inclined is determined in accordance with a position, in the game space, based on the designated coordinates designated by the pointing device. Accordingly, while a player uses the pointing device so as to designate a position, in the game space, corresponding to a destination to move, the player can control the movement speed so as to operate the object without feeling dissatisfied.

According to the second aspect, the reference coordinates used as a reference for calculating the distance is set to a position at which an object to be moved is displayed. Therefore, the player can designate an input distance using, as the reference, the display position of the object to be moved. Therefore, the player can intuitively input the movement speed of the object to be moved.

According to the third aspect, the position of the reference coordinates used as the reference for calculating the distance is fixed as the center of the display screen, whereby the player can designate the input distance using the center of the display screen as the reference.

According to the fourth aspect, when the pointing device is used so as to move the object in the virtual game space, the target coordinates are set to the position, on the game field, on which the designated coordinates are superimposed, so as to obtain the moving direction. For example, when an operation performed by the joy stick is emulated, a direction toward which the joy stick is inclined is determined in accordance with the position, on the game field, on which a position represented by the designated coordinates designated by the pointing device is superimposed. Accordingly, while the player uses the pointing device so as to directly designate the position, in the game space, corresponding to a destination to move, the player can control the movement speed so as to operate the object without feeling dissatisfied.

According to the fifth aspect, the target speed of the object can be calculated by assigning, to a predetermined function, an input distance obtained by using the pointing device. Therefore, a target distance based on the input distance can be determined using the function. For example, the target distance can be set so as to be proportional to the input distance. Further, when the input distance is long, the target distance can be gradually increased, so that the target distance can be determined based on the input distance so as to represent various responses.

According to the sixth aspect, when a distance having a value greater than the first threshold value is inputted, the target speed is set so as to have a constant value of the maximum target speed. Accordingly, even when a shape of the display screen allows a relatively long distance to be inputted, the target speed can be set so as not to have a value greater than the maximum target speed. Therefore, it is possible to prevent the target speed from being determined depending on the shape of the display screen, thereby avoiding unbalanced game process.

According to the seventh aspect, an area in which the target speed is set to zero can be provided near the reference coordinates.

According to the eighth aspect, when the touch panel is used to move the object in the virtual game space, the movement speed is set to a value calculated from the distance between the reference coordinates and the touch coordinates on the touch panel, and a movement angle is determined in accordance with the target coordinates, in the virtual game space, corresponding to the touch coordinates on the touch panel. That is, the movement speed can be determined in accordance with a distance, in the touch panel coordinate system, which is not influenced by a shape or an inclination of a game field. Accordingly, when a player inputs a desired distance corresponding to a touch distance on the touch panel, a desired movement speed can be obtained. Accordingly, while the player designates, as a destination, a position in the game space corresponding to a position at which the player touches the touch panel, the player can control the movement speed so as to operate the object without feeling dissatisfied.

Further, the game apparatus according to the present invention can realize the same effect as the aforementioned storage medium having the game program stored thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a side view illustrating a positional relationship between the game space coordinate system and the touch panel 15;

FIG. 11 is a side view illustrating an exemplary state where a touch panel TP is set in a virtual game space when a game image is rendered such that a plane game field GF in the virtual game space, on which a character PC to be operated is disposed, is diagonally viewed from above;

FIG. 13 is a side view illustrating an exemplary state where a touch panel TP is set in a virtual game space when a game image is rendered such that a character PC to be operated, on a game field GF of a curved surface in the virtual game space, is diagonally viewed from above.

DETAILED DESCRIPTION

Figure 1:
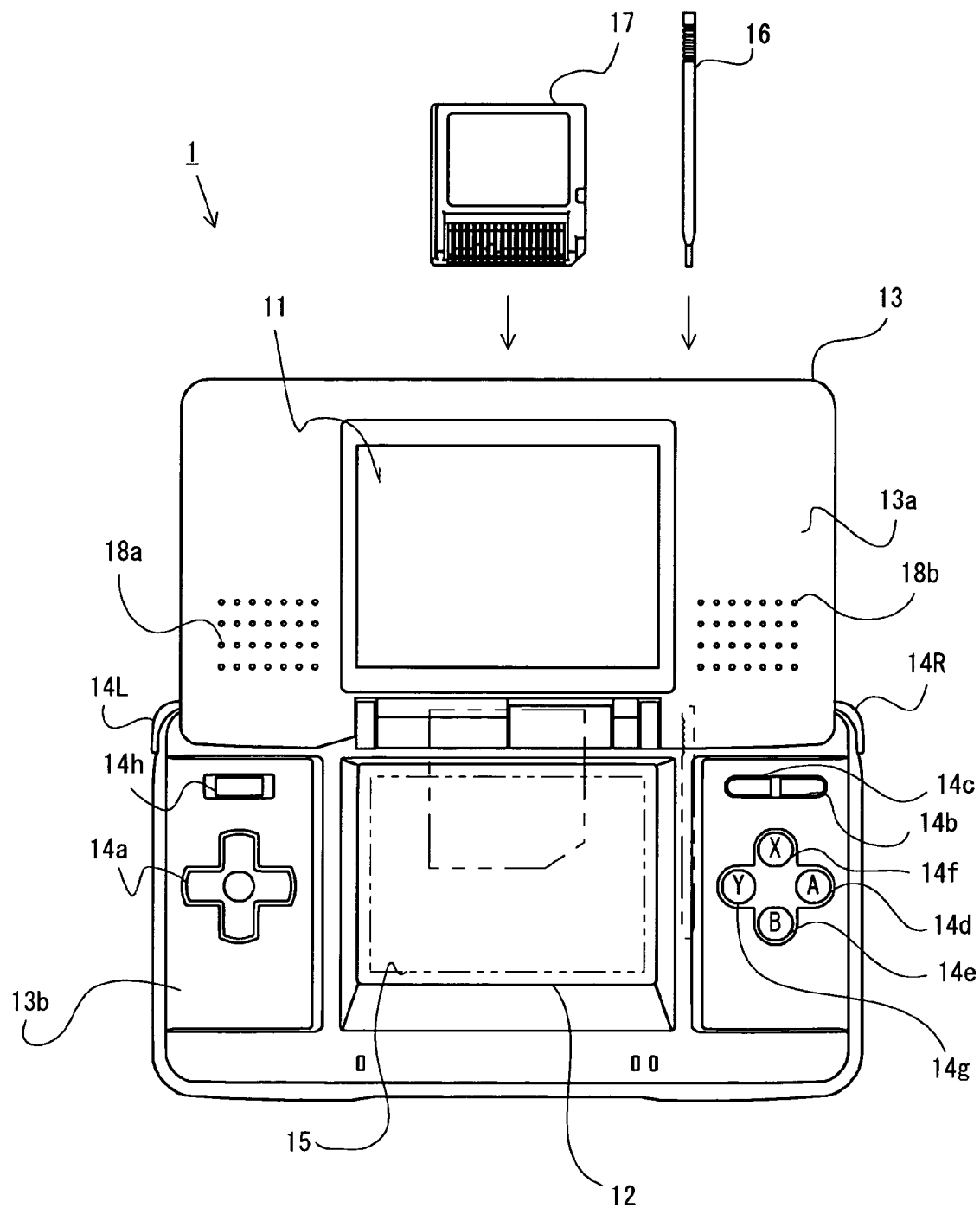
FIG. 1 is a view illustrating an outer appearance of a game apparatus 1 for executing a game program of the present invention.

With reference to the drawings, a game apparatus for executing a game program according to an embodiment of the present invention will be described. While the game program of the present invention is executed by any computer system capable of performing a display on a display device, the game program is executed by a game apparatus 1 typifying an information processing apparatus (game apparatus) in the present embodiment. FIG. 1 is a view illustrating an outer appearance of the game apparatus 1 for executing the game program of the present invention. In the present embodiment, a hand-held game apparatus will be described as an example of the game apparatus 1.

In FIG. 1, the game apparatus 1 includes a first liquid crystal display (hereinafter, referred to as "an LCD") 11 and a second LCD 12. A housing 13 is composed of an upper housing 13a and a lower housing 13b. The first LCD 11 is accommodated in the upper housing 13a and the second LCD 12 is accommodated in the lower housing 13b. Each of the first LCD 11 and the second LCD 12 has a resolution of 256 dots×192 dots. Although in the present embodiment, an LCD is used as a display device, any other display device, for example, a display device using EL (electro luminescence), can be used. Further, the resolutions of the first LCD 11 and the second LCD 12 may be arbitrarily chosen.

On the upper housing 13a, provided are sound holes 18a and 18b for outputting a sound from a pair of loudspeakers 30a and 30b shown in FIG. 2 described below.

On the lower housing 13b, provided as input devices are a cross switch 14a, a start switch 14b, a select switch 14c, an A button 14d, a B button 14e, an X button 14f, a Y button 14g, a power supply switch 14h, an L button 14L and an R button 14R. Further, the second LCD 12 has a touch panel 15 mounted on the screen thereof as another input device. Moreover, the lower housing 13b is provided with respective receptacles into which a memory card 17 and a stick 16 may be inserted.

The touch panel 15 may be of any type such as a resistive film type, an optical type (infrared type), or a capacitive coupling type. The touch panel 15 is, for example a pointing device having a function of outputting, when the touch panel 15 has its surface touched by the stick 16, coordinate data corresponding to the touched position. Although in the present embodiment a player controls the touch panel 15 with the stick 16, the player can control the touch panel 15 with a pen (stylus pen) or a finger instead of the stick 16. In the present embodiment, the touch panel 15 has a resolution (detection accuracy) of 256 dots×192 dots, similar to the resolution of the second LCD 12. However, the touch panel 15 need not necessarily have the same resolution as the second LCD 12.

The memory card 17 is a storage medium having a game program and the like stored thereon, and is detachably inserted into the receptacle provided in the lower housing 13b.

Next, referring to FIG. 2, the internal structure of the game apparatus 1 will be described. FIG. 2 is a block diagram illustrating an internal structure of the game apparatus 1.

Figure 2:
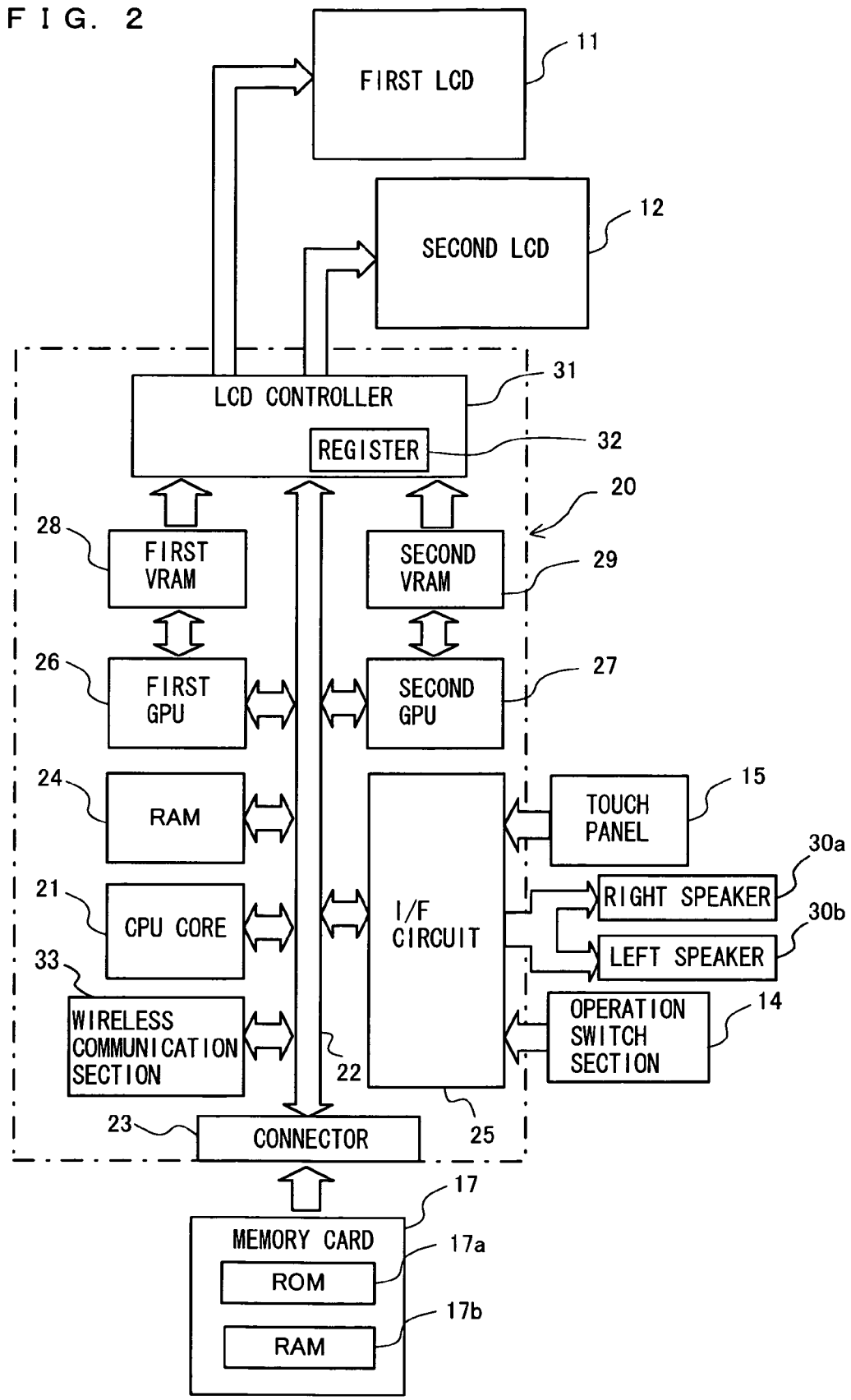
FIG. 2 is a block diagram illustrating an internal structure of the game apparatus 1 shown in FIG. 1.

In FIG. 2, a CPU core 21 is mounted on the electronic circuit board 20 accommodated in the housing 13. Via a bus 22, the CPU core 21 is connected to a connector 23, an input/output interface circuit (denoted as an I/F circuit in FIG. 2) 25, a first graphics processing unit (hereinafter, referred to as "GPU") 26, a second GPU 27, a RAM 24, an LCD controller 31, and a wireless communication section 33. The memory card 17 is detachably connected to the connector 23. The memory card 17 includes a ROM 17a for storing a game program and a RAM 17b for storing backup data in a rewritable manner. A game program stored in the ROM 17a of the memory card 17 is loaded to the RAM 24, and the game program having been loaded to the RAM 24 is executed by the CPU core 21. Data used for generating temporary data obtained by the CPU core 21 executing the program, and the like, are stored in the RAM 24 as necessary in addition to the game program. The touch panel 15, the right loudspeaker 30a, the left loudspeaker 30b and an operation switch section 14 including the cross switch 14a, the A button 14d and the like as shown in FIG. 1 are connected to the I/F circuit 25. The right loudspeaker 30a and the left loudspeaker 30b are placed inside the sound holes 18a and 18b, respectively.

The first GPU 26 is connected to a first video-RAM (hereinafter, referred to as "VRAM") 28. The second GPU 27 is connected to a second VRAM 29. In accordance with an instruction from the CPU core 21, the first GPU 26 generates a first display image using the data stored in the RAM 24 for generating the display image, and writes display image data into the first VRAM 28. Similarly, in accordance with an instruction from the CPU core 21, the second GPU 27 generates a second display image, and writes display image data into the second VRAM 29. The first VRAM 28 and the second VRAM 29 are connected to the LCD controller 31.

The LCD controller 31 includes a register 32. The register 32 stores a value "0" or "1" in accordance with an instruction from the CPU core 21. When the register 32 stores a value "0", the LCD controller 31 outputs to the first LCD 11 the first game image which has been written into the first VRAM 28, and outputs to the second LCD 12 the second game image which has been written into the second VRAM 29. On the other hand, when the register 32 stores a value "1", the LCD controller 31 outputs to the second LCD 12 the first game image which has been written into the first VRAM 28, and outputs to the first LCD 11 the second game image which has been written into the second VRAM 29.

The wireless communication section 33 has a function of exchanging data used for game process and other data with a wireless communication section 33 of another game apparatus, and the function is, for example, a wireless communication function based on the IEEE802.11 wireless LAN standard. The wireless communication section 33 outputs the received data to the CPU core 21. Further, the wireless communication section 33 transmits data to another game apparatus according to an instruction from the CPU core 21. The wireless communication section 33 or the storage section of the game apparatus 1 has a protocol such as TCP/IP (transmission control protocol/Internet protocol) or a predetermined browser, whereby the game apparatus 1 can be connected to a network such as the Internet via the wireless communication section 33. The game apparatus 1 enables data such as a document and an image accessible on a network to be displayed on the first LCD 11 and the second LCD 12.

The game program of the present invention may be supplied to the computer system not only through an external storage medium such as the memory card 17 but also by using a wired or a wireless communication line. Moreover, the game program may be previously stored in a non-volatile storage device in the computer system. Examples of the information storage medium for storing the game program are not limited to the aforementioned non-volatile semiconductor memory, but may also be a CD-ROM, a DVD or any other optical disk type storage medium.

Figure 3:
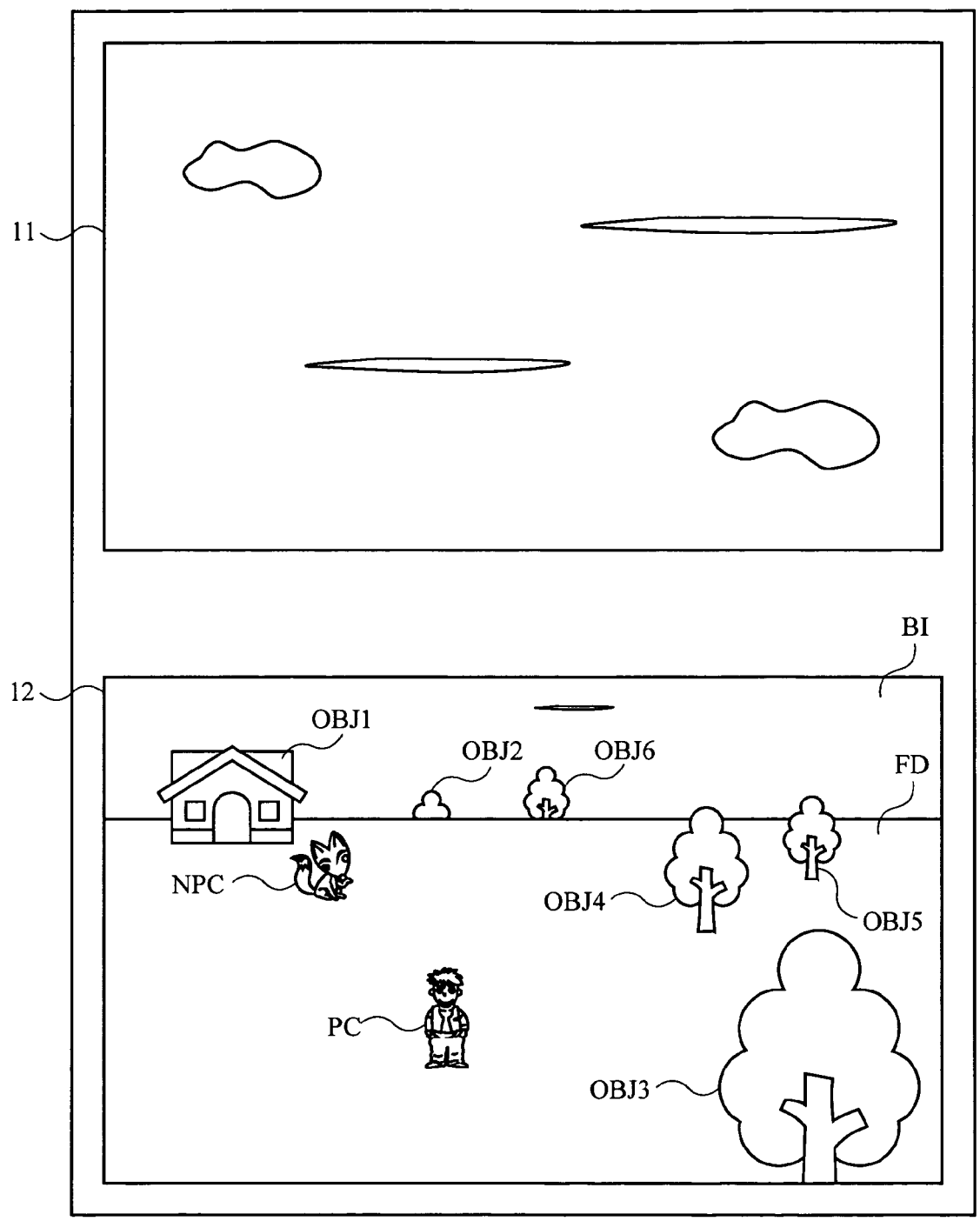
FIG. 3 is a diagram illustrating exemplary screen displays on a first LCD 11 and a second LCD 12.
Figure 4:
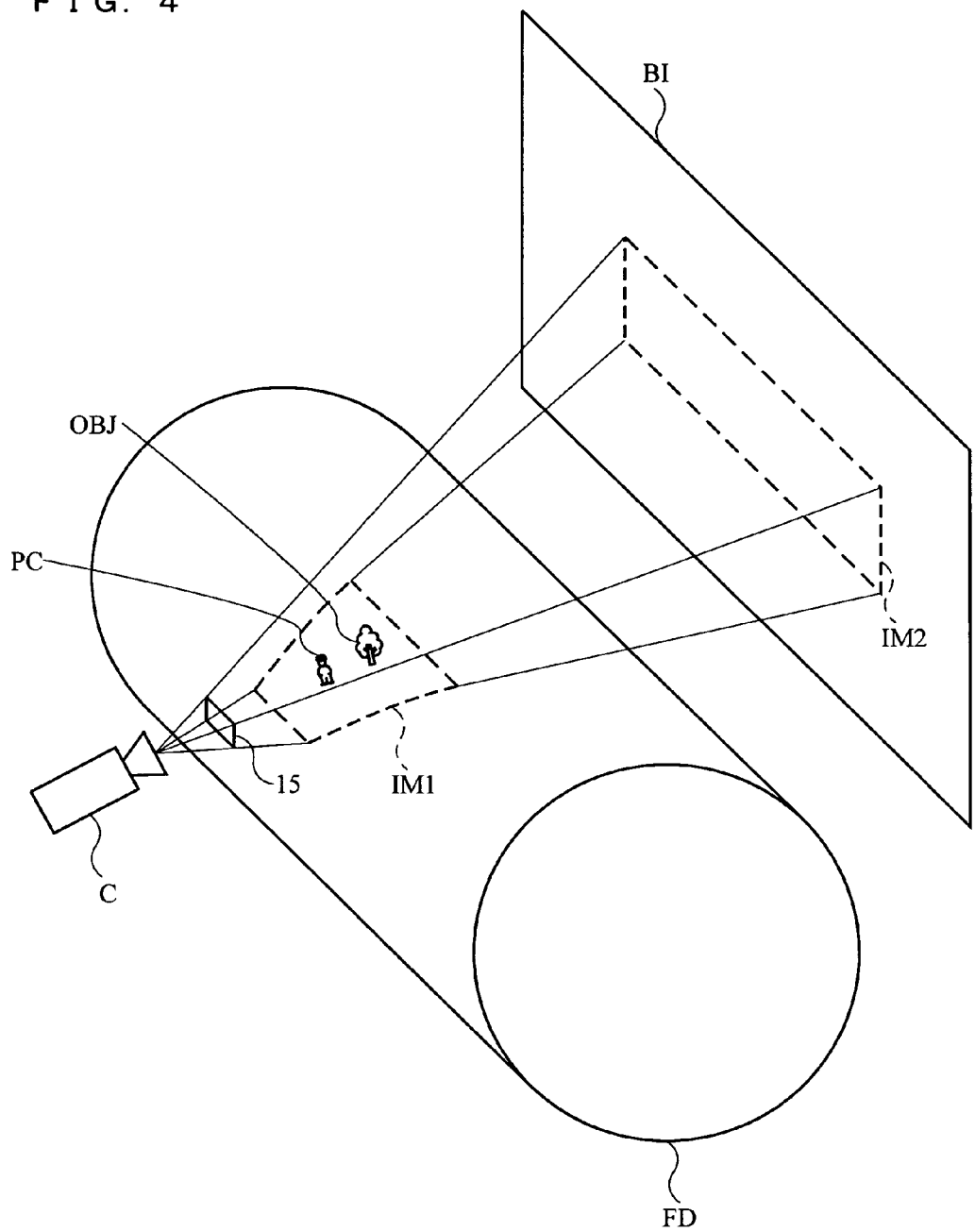
FIG. 4 is a schematic perspective view illustrating a positional relationship between a touch panel 15 and a game space coordinate system used for generating a game image to be displayed on the second LCD 12.
Figure 6:
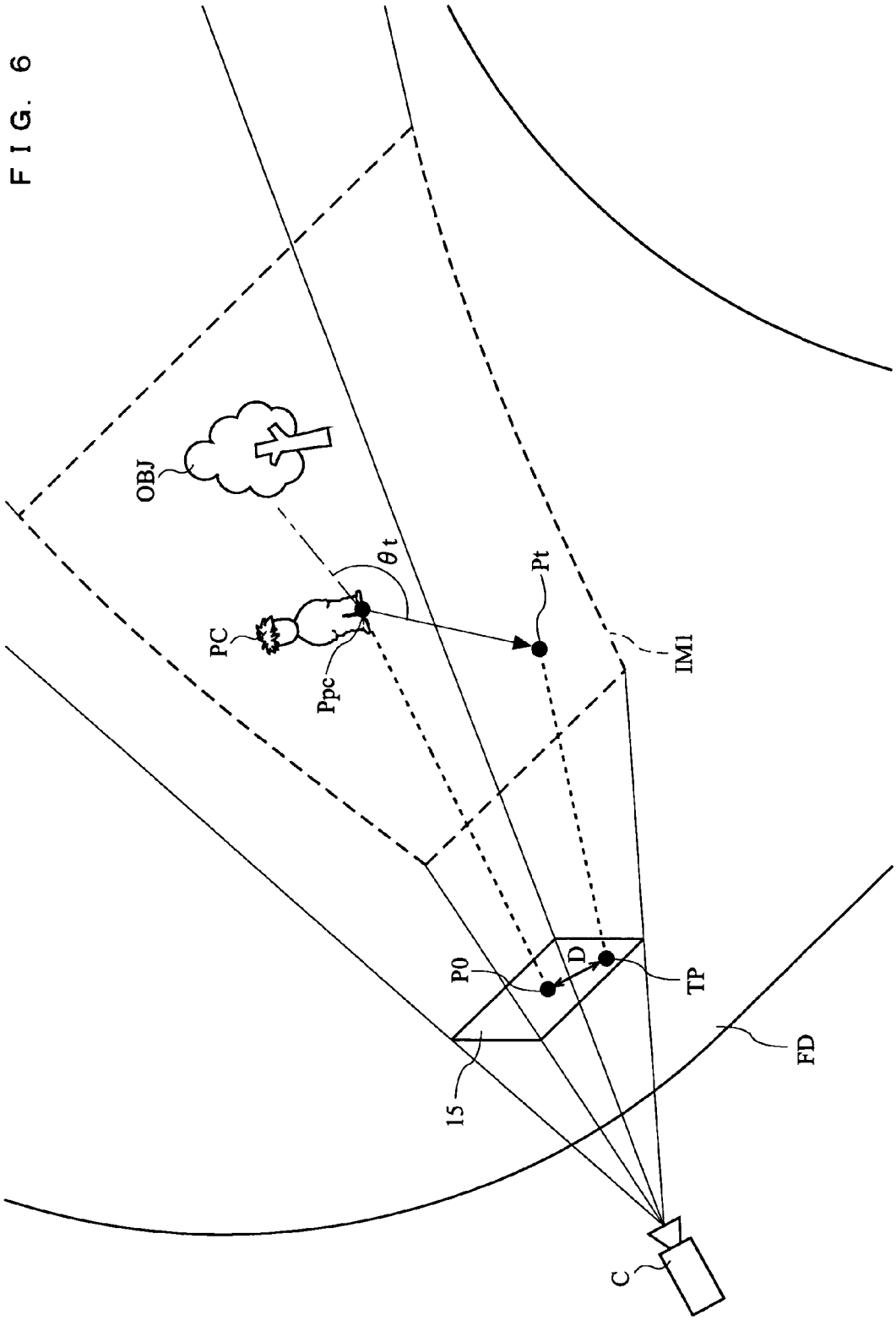
FIG. 6 is a schematic perspective view illustrating a distance D and a target angle et used for a game process by enlarging a portion of FIG. 4.

Next, a specific process operation performed by the game apparatus 1 executing the game program will be described. Firstly, with reference to FIGS. 3 to 6, an exemplary process, an exemplary display method for performing displays on the first LCD 11 and the second LCD 12, and the like, which are performed through the process operation by the game apparatus 1, will be described. FIG. 3 is a diagram illustrating exemplary screen displays on the first LCD 11 and the second LCD 12. FIG. 4 is a schematic perspective view illustrating a positional relationship between the touch panel 15 and a game space coordinate system used for generating a game image to be displayed on the second LCD 12. FIG. 5 is a side view illustrating a positional relationship between the game space coordinate system and the touch panel 15. FIG. 6 is a schematic perspective view illustrating a distance D and a target angle et used for the game process by enlarging a portion of FIG. 4.

In FIG. 3, a game image is displayed on each of the first LCD 11 and the second LCD 12 of the game apparatus 1. The game image according to the present invention is mainly displayed on the second LCD 12. Hereinafter, an image displayed on the second LCD 12 is merely referred to as a game image.

A player character PC, a non-player character NPC, and objects OBJ are positioned on a drum field FD in a game space and displayed in a game image on the second LCD 12. For example, one player character PC, one non-player character NPC and six objects OBJ1 to OBJ6 are displayed in the game image shown in FIG. 3. The drum field FD is a cylindrical game field (that is, a game field of a curved surface) which has a portion of the cylindrically curved surface displayed in the game image and has its cylinder axis horizontally disposed in the game space. The player character PC, the non-player character NPC, and the object OBJ are positioned on the cylindrically curved surface in the drum field FD. For example, the player character PC is a character which can move along the cylindrically curved surface of the drum field FD in the game space. Further, a background BI (for example, the sky) is displayed at the back of the drum field FD. In FIG. 3, for example, the game image is obtained by perspective-projecting (performing a far-to-near projection on) the cylindrically curved surface from a virtual camera when the cylindrically curved surface as seen from the side of the drum field FD is set as a sight point and a portion of the cylindrically curved surface is set as a rendered range.

FIG. 4 shows a virtual three-dimensional game space in which the touch panel 15 and a virtual camera C used for generating the game image are disposed. In the game space, the drum field FD and the background BI are set with respect to the virtual camera C. The virtual camera C is disposed at the side of the cylindrically curved surface of the drum field FD. The game space set in a viewing volume between predetermined clipping planes based on a camera position of the virtual camera C is displayed in the game image on the second LCD 12. In FIG. 4, for example, the game image is composed of an image IM1 and an image IM2. The image IM1 is obtained by perspective-projecting, from the virtual camera C, a portion of the cylindrically curved surface of the drum field FD. The image IM2 is obtained by perspective-projecting, from the virtual camera C, the background BI rendered at the back of the drum field FD. At this time, a rendering model of each of the objects, such as the player character PC and the object OBJ in FIG. 4, is positioned on the drum field FD based on position coordinates described below. The rendering models in the viewing volume are also displayed on the second LCD 12. The touch panel 15 is represented at the near clipping plane as seen from the virtual camera C (that is, at the side of the virtual camera C), thereby setting a touch panel coordinate system. Input coordinates from the touch panel 15 are perspective-transformed along a line of sight direction of the virtual camera C into coordinates in the game space.

FIG. 5 shows that touch input coordinates (hereinafter, simply referred to as "touch coordinates) obtained when a player touches the touch panel 15 are perspective-transformed into coordinates in the game space. For example, when a player touch-operates the touch panel 15 at a position indicated as a stick 16a, a straight line (marked by dotted lines in FIG. 5) which is obtained by perspective-projecting touch coordinates obtained by the touch-operation into the game space along the line of sight direction extending radially from the virtual camera C, intersects or contacts the player character PC. At this time, it is determined that the player has touch-operated the player character PC. Further, it is determined that an intersection point Pta at which the straight line intersects the drum field FD through the player character PC is a point, on the drum field FD, at which the player has touch-operated the touch panel 15. The game space coordinates representing the intersection point Pta are target position coordinates into which the position indicated as the stick 16a at which the player has touch-operated the touch panel 15 is perspective-transformed.

When the player touch-operates the touch panel 15 at a position indicated as a stick 16b, a straight line which is obtained by perspective-projecting touch coordinates obtained by the touch-operation into the game space along the line of sight direction extending radially from the virtual camera C, intersects or contacts the object OBJ. At this time, it is determined that the player has touch-operated the object OBJ. Further, it is determined that an intersection point Ptb at which the straight line intersects the drum field FD through the object OBJ is a point, on the drum field FD, at which the player has touch-operated the touch panel 15. The game space coordinates representing the intersection point Ptb are target position coordinates into which the position indicated as the stick 16b at which the player has touch-operated the touch panel 15 is perspective-transformed.

When the player touch-operates the touch panel 15 at a position indicated as a stick 16c, a straight line which is obtained by perspective-projecting touch coordinates obtained by the touch-operation into the game space along the line of sight direction extending radially from the virtual camera C directly intersects the drum field FD. At this time, it is determined that an intersection point Ptc at which the straight line intersects the drum field FD is a point, on the drum field FD, at which the player has touch-operated the touch panel 15. In this case, it is determined that no character and object have been touch-operated by the player. The game space coordinates representing the intersection point Ptc are target position coordinates into which the position indicated as the stick 16c at which the player has touch-operated the touch panel 15 is perspective-transformed.

As shown in FIG. 6, when a player touch-operates the touch panel 15 at a position indicated as the touch coordinates TP, the target position coordinates Pt are obtained by perspective-transforming the touch coordinates TP into coordinates on the drum field FD. That is, the target position coordinates Pt represent a position, on the drum field FD, on which the position at which the player has touched the touch panel 15 is superimposed. The player character PC is represented as position coordinates Ppc on the drum field FD. A straight line connecting between the position coordinates Ppc and the virtual camera C along the line of sight direction of the virtual camera C intersects the touch panel 15. An intersection point at which the straight line intersects the touch panel 15 is determined as reference coordinates P0. In the touch panel coordinate system, the distance D between the reference coordinates P0 and the touch coordinates TP is obtained.

As described above, when the target position coordinates Pt and the distance D are obtained in accordance with the touch operation performed by the player, the player character PC is moved on the drum field FD in accordance with the target position coordinates Pt and the distance D. Specifically, an angle between a reference direction (for example, a direction indicated by a dash-dot line in FIG. 6) in the game space and a direction from the position coordinates Ppc to the target position coordinates Pt is calculated as a target angle θt. A target speed Vt is calculated based on the distance D. The player character PC moves on the drum field FD toward the direction defined by the target angle θt by increasing or reducing a movement speed thereof to the target speed Vt. That is, the player character PC moves to a destination corresponding to a position, on the drum field FD, on which the touch position on the touch panel 15 is superimposed, at the movement speed based on the distance, between the reference coordinates P0 and the touch coordinates, calculated on the touch panel 15.

Figure 7:
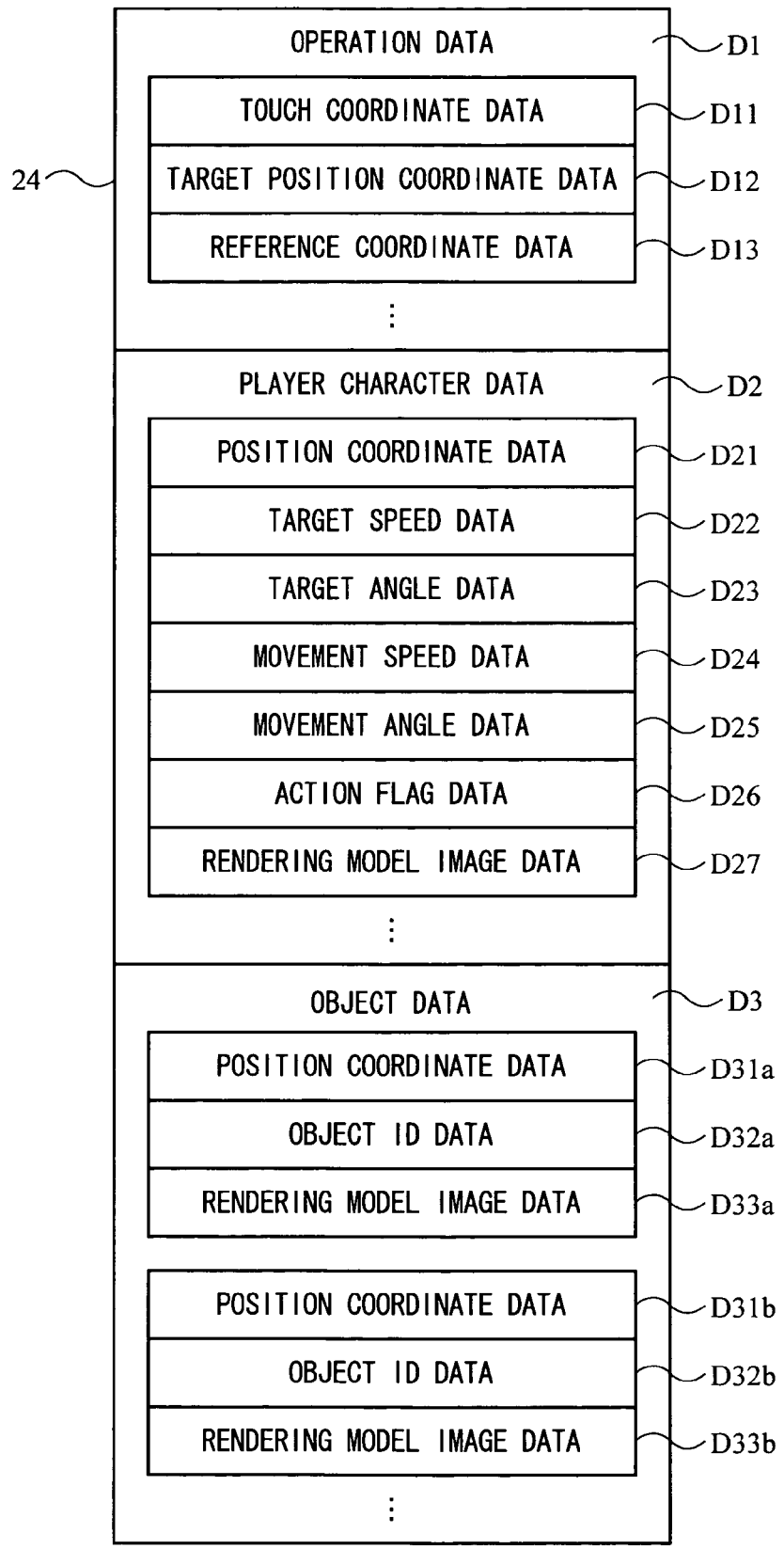
FIG. 7 is a diagram illustrating an example of various data to be stored in a RAM 24 during the game process operation.
Figure 8:
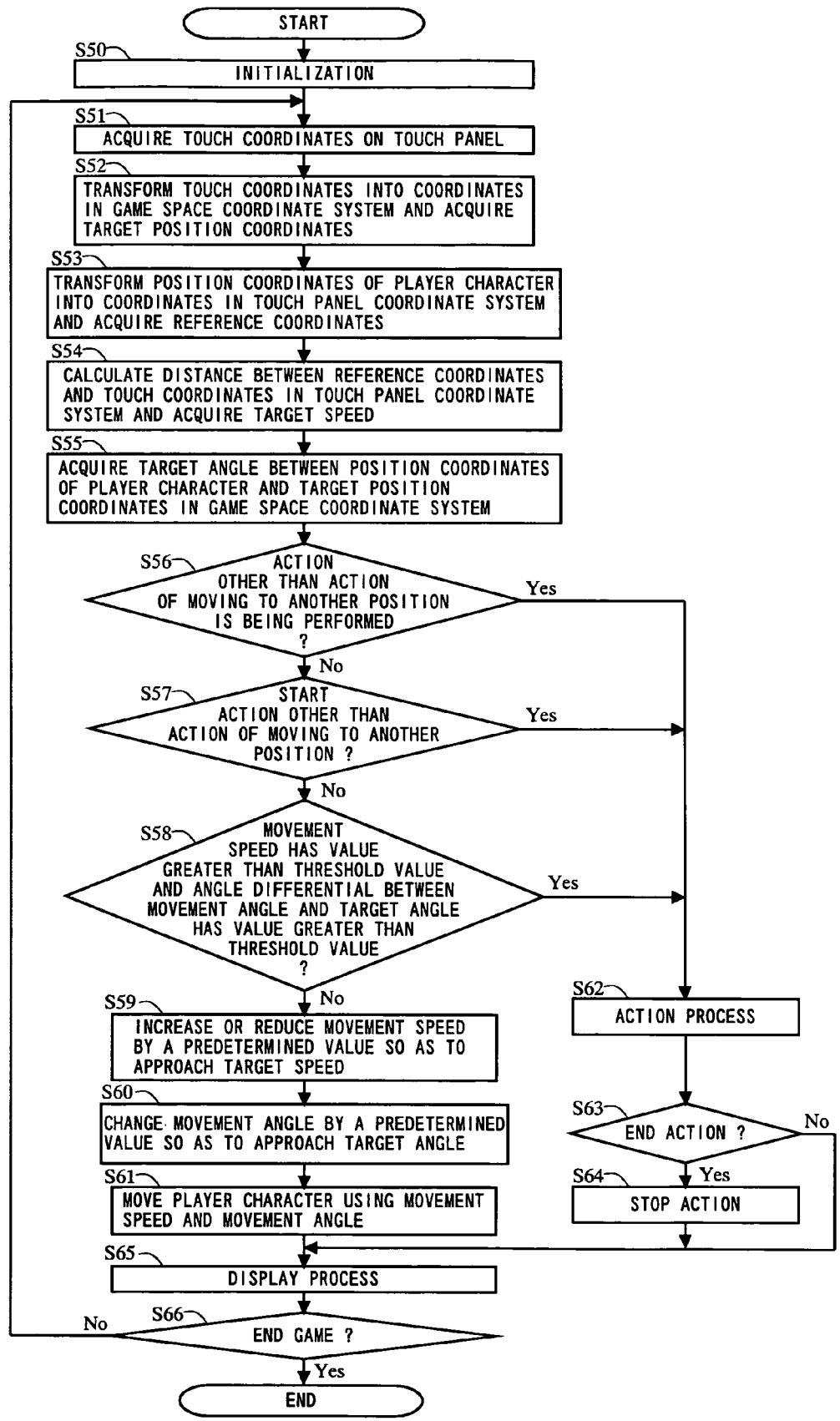
FIG. 8 is a flow chart illustrating a game process operation performed by the game apparatus 1 by executing the game program.
Figure 9:
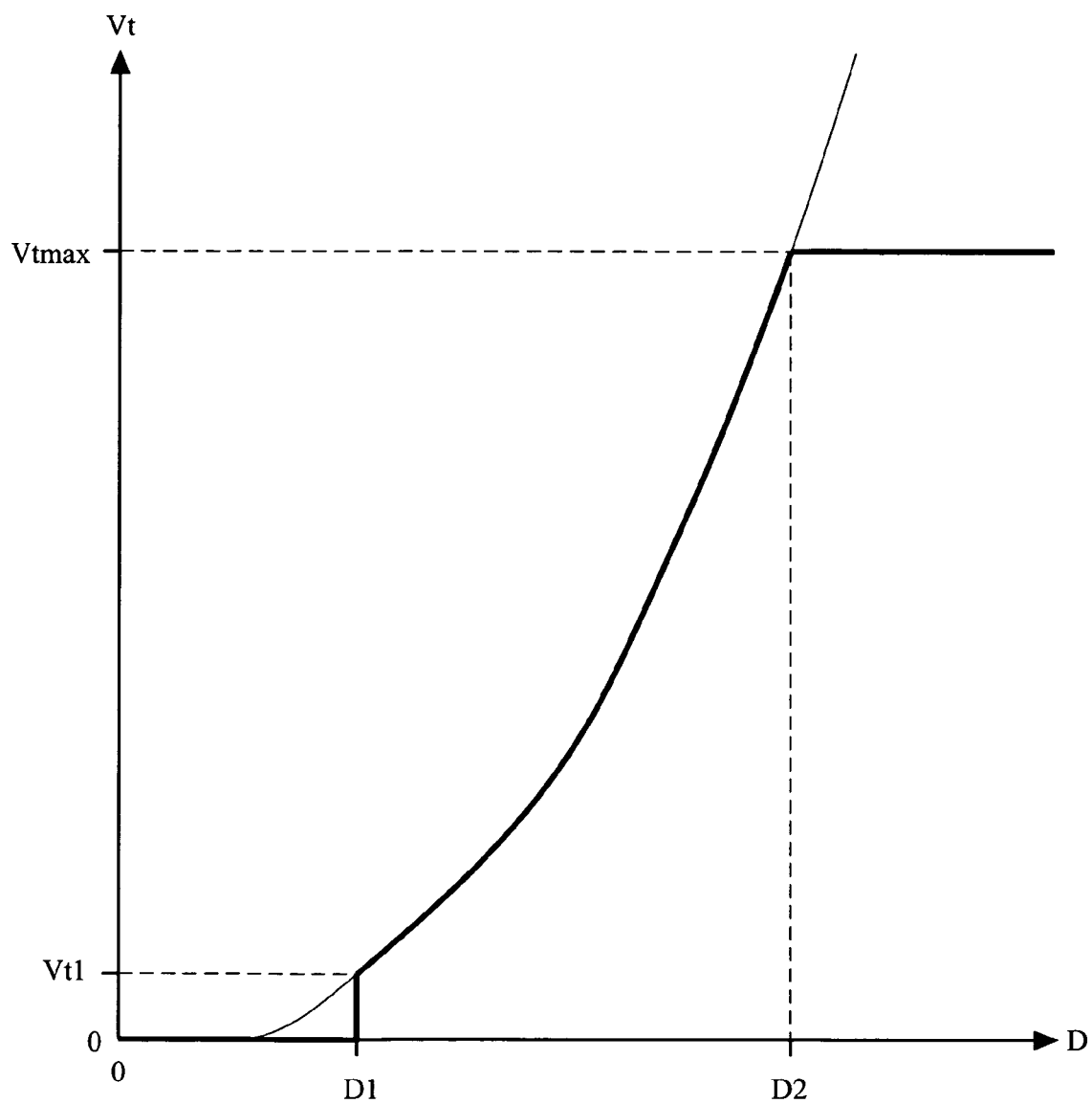
FIG. 9 is a graph showing a relationship between the distance D and a target speed Vt.
Figure 10:
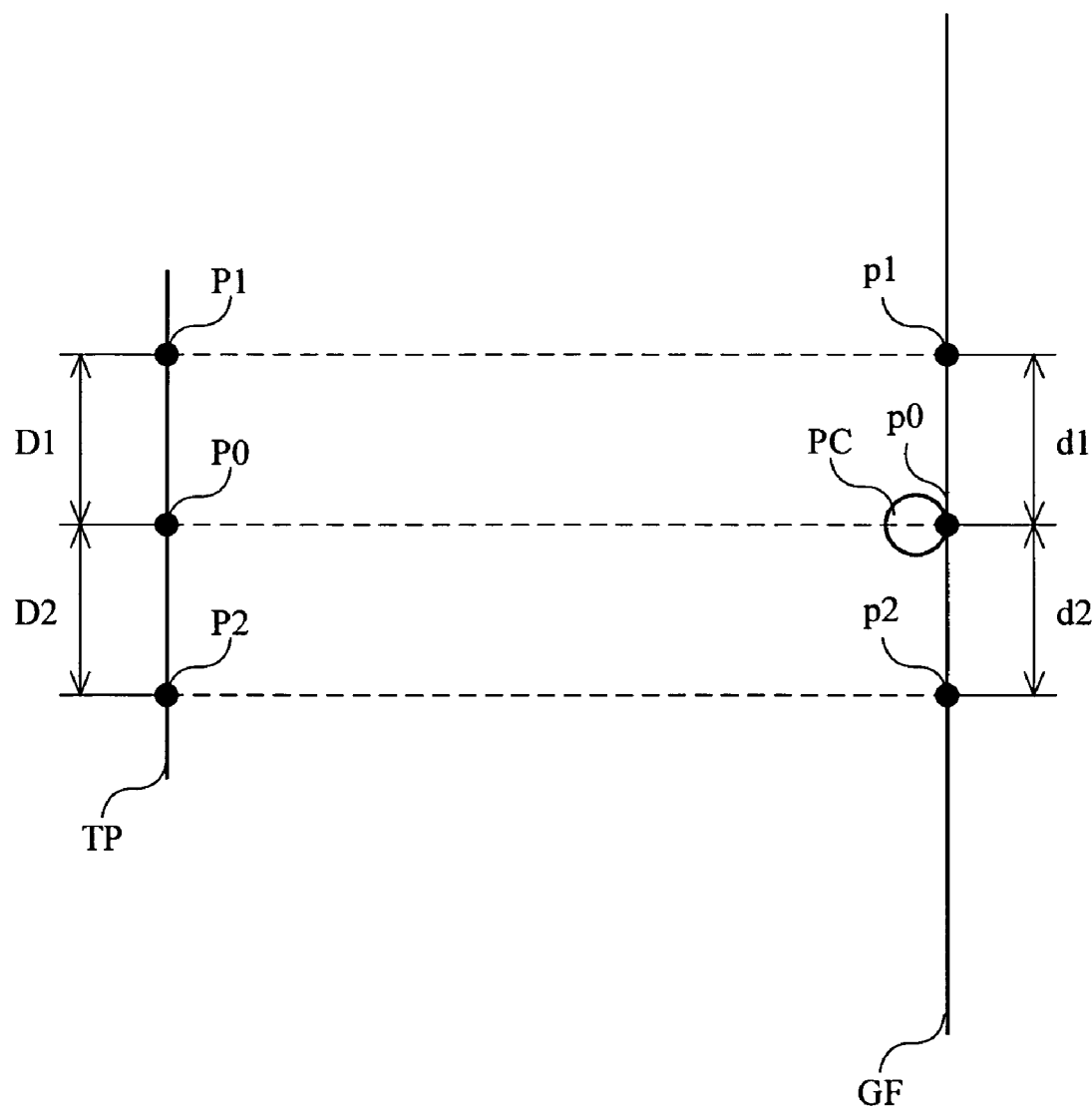
FIG. 10 is a side view illustrating an exemplary state where a touch panel TP is set in a virtual game space when a game image is rendered such that a plane game field GF in the virtual game space, on which a character PC to be operated is disposed, is vertically viewed from above.
Figure 12:
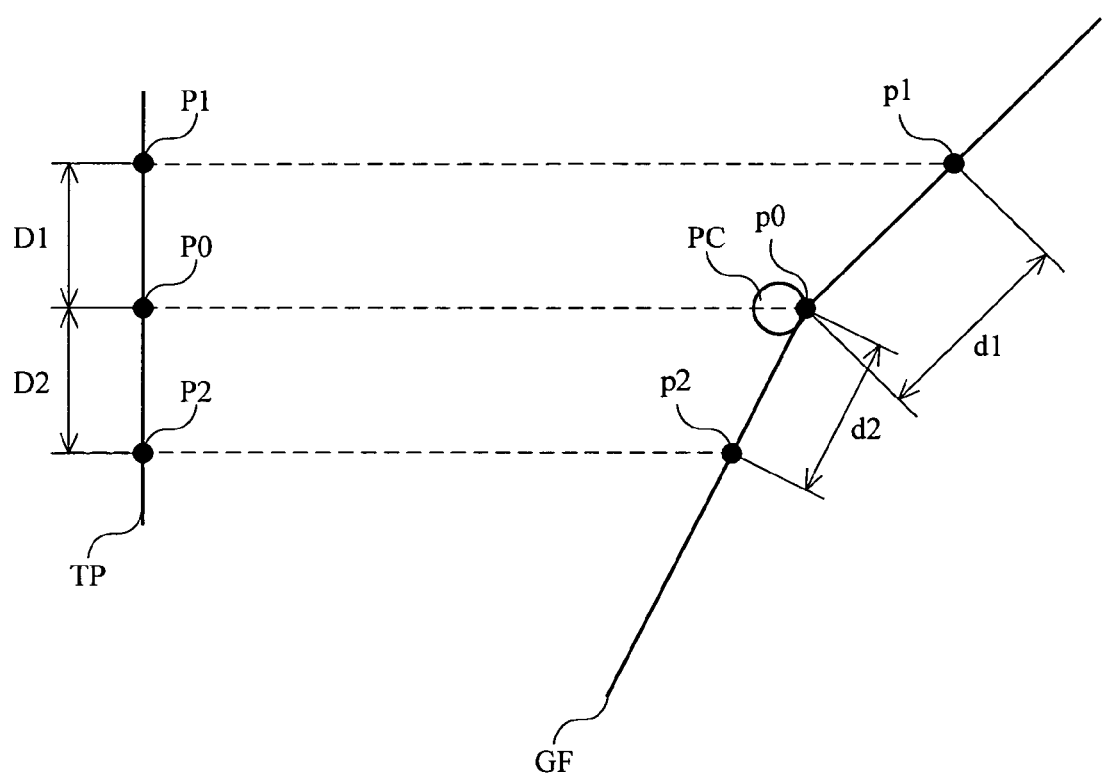
FIG. 12 is a side view illustrating an exemplary state where a touch panel TP is set in a virtual game space when a game image is rendered such that a character PC to be operated, on a game field GF of two planes in the virtual game space each having a different inclination, is diagonally viewed from above.

Next, with reference to FIGS. 7 to 9, the process operation performed by the game apparatus 1 executing the game program will be specifically described. FIG. 7 is a diagram illustrating an example of various data to be stored in the RAM 24 during the game process operation. FIG. 8 is a flow chart illustrating the game process operation performed by the game apparatus 1 by executing the game program. FIG. 9 is a graph showing a relationship between the distance D and the target speed Vt. The program for executing the processes are contained in the game program stored in the ROM 17a, and when the game apparatus 1 is turned on, the program is loaded from the ROM 17a to the RAM 24 and executed by the CPU core 21. Among the game process, game process steps relating to a movement and an action of the player character PC will be described with reference to the flow chart shown in FIG. 8. Other game process steps, which are not directly relevant to the present invention, are not described in detail. In FIG. 8, steps executed by the CPU 21 are each abbreviated as "S".

The RAM 24 shown in FIG. 7 includes a program storage area and a data storage area. However, FIG. 7 shows only the data storage area used for the process relating to the movement and the action of the player character PC according to the present invention. Specifically, operation data D1, player character data D2, and object data D3 are generally stored in the data storage area of the RAM 24.

The operation data D1 includes touch coordinate data D11, target position coordinate data D12, reference coordinate data 13, and the like. The touch coordinate data D11 represents touch coordinates TP (as shown in FIG. 6), in the touch panel coordinate system, at which a player is currently touching the touch panel 15. The target position coordinate data D12 represents target position coordinates Pt (as shown in FIG. 6), on the drum field FD, into which the touch coordinates TP are perspective-transformed. The reference coordinate data D13 represents reference coordinates P0 (as shown in FIG. 6), in the touch panel coordinate system, into which the position coordinates Ppc of the player character PC are transformed.

The player character data D2 includes: position coordinate data D21; target speed data D22; target angle data D23; movement speed data D24; movement angle data D25; action flag data D26; rendering model image data D27; and the like. The position coordinate data D21 represents, using, for example, three-dimensional coordinates (X, Y, Z), position coordinates Ppc (as shown in FIG. 6) of the player character PC disposed in the game space coordinate system. The target speed data D22 represents a target speed Vt to be attained as a movement speed of the player character PC. The target angle data D23 represents a target angle θt (as shown in FIG. 6) representing an angle between a reference direction in the game space and a direction from the position coordinates Ppc to the target position coordinates Pt. The movement speed data D24 represents a movement speed at which the player character PC is currently moving in the game space. The movement angle data D25 represents an angle between the reference direction in the game space and a direction in which the player character PC is currently moving or facing. The action flag data D26 represents a flag indicating whether or not the player character PC is performing a predetermined action and also represents a type of the predetermined action. The rendering model image data D27 represents image/model data used for generating a game image of the player character PC and detecting for a subject having been touch-operated.

The object data D3 includes position coordinate data D31, object ID data D32, rendering model image data D33 and the like. The object data D3 represents a database used for disposing a non-player character and other various objects in the game space, and contains position coordinate data D31a, D31b, ..., object ID data D32a, D32b, ..., rendering model image data D33a, D33b, ..., and the like, for the respective objects. The position coordinate data D31 represents, using, for example, three-dimensional coordinates (X, Y, Z), position coordinates of the respective objects OBJs disposed in the game space coordinate system. The object ID data D32 represents a unique number assigned to each of the objects, by which a type of each object can be identified as, for example, a non-player character or another object. The rendering model image data D33 represents image/model data used for generating a game image of the objects OBJs and the non-player character and detecting for a subject having been touch-operated.

Initially, when the power supply (for example, the power supply switch 14h) of the game apparatus 1 is turned on, the CPU core 21 executes a boot program (not shown), whereby the game program stored in the memory card 17 is loaded to the RAM 24. The game program having been loaded is executed by the CPU core 21, whereby steps shown in FIG. 8 are executed.

In FIG. 8, the CPU core 21 performs an initialization for the game in step 50, and advances the process to the next step. For example, the CPU core 21 sets up data relating to the player character PC and the objects OBJs which appear in the game space and stores the data in the RAM 24 in the initialization process in step 50.

Next, in step 51, the CPU core 21 acquires the touch coordinates TP, on the touch panel 15, representing the touch position at which the player is currently touching the touch panel 15, and the touch coordinate data D11 stored in the RAM 24 has its data updated to data representing the touch coordinate TP having been acquired. In step 52, the CPU core 21 transforms the touch coordinates TP in the touch panel coordinate system into coordinates in the game space coordinate system so as to acquire the target position coordinates Pt, and the target position coordinate data D12 stored in the RAM 24 has its data updated to data representing the target position coordinates Pt having been acquired, and the CPU core 21 advances the process to the next step. For example, the CPU core 21 perspective-transforms the touch coordinates TP into coordinates in the drum field FD, thereby calculating the target position coordinates Pt. In this case, the target position coordinates Pt represent a position, on the drum field FD, on which a position represented by the touch coordinates TP is superimposed. When the player character PC and another object OBJ are disposed at the position on which the position represented by the touch coordinates TP is superimposed, the CPU core 21 acquires the target position coordinates Pt so as to determine the player character PC or the another object OBJ as a contacting object (see FIG. 5).

Next, in step 53, the CPU core 21 transforms the position coordinates Ppc of the player character PC into coordinates in the touch panel coordinate system so as to acquire the reference coordinates P0, and the reference coordinate data D13 stored in the RAM 24 has its data updated to data representing the reference coordinates P0 having been acquired, and the CPU core 21 advances the process to the next step. For example, the CPU core 21 acquires, as the reference coordinates P0, an intersection point at which the straight line connecting between the position coordinates Ppc and the virtual camera C along the line of sight direction of the virtual camera C intersects the touch panel 15 as shown in FIG. 6. The reference coordinates P0 may be fixed. For example, when the position (for example, the center of the second LCD 12 or the center of the lower half portion of the second LCD 12) of the player character PC to be displayed is fixed with respect to the second LCD 12, a position superimposed on the position of the player character PC on the touch panel 15 may be used as the reference coordinates P0.

Next, in step 54, the CPU core 21 calculates the distance D between the reference coordinates P0 and the touch coordinates TP in the touch panel coordinate system so as to calculate the target speed Vt in accordance with the distance D, and the target speed data D22 stored in the RAM 24 has its data updated to data representing the target speed Vt having been calculated. Hereinafter, with reference to FIG. 9, a relationship between the distance D and the target speed Vt will be described.

In FIG. 9, the CPU core 21 calculates the target speed Vt in accordance with the distance D using a predetermined function. For example, the target speed Vt is calculated using equation 1 as follows.

$$Vt = b*(D-a)^{3/2} \qquad \text{equation 1}$$

where a and b are each a constant. Further, the CPU core 21 sets a maximum target speed Vtmax and a low target speed Vt1. For example, when the target speed Vt having been calculated using equation 1 has a value greater than or equal to the maximum target speed Vtmax, the CPU core 21 sets the target speed Vt so as to have a value of the maximum target speed Vtmax. When the target speed Vt having been calculated using equation 1 has a value smaller than the low target speed Vt1, the CPU core 21 sets the target speed Vt to zero. Therefore, the touch panel 15 has an area in which the target speed Vt is zero, an area in which the target speed Vt varies between the low target speed Vt1 and the maximum target speed Vtmax, and an area in which the target speed Vt has a constant value equivalent to the maximum target speed Vtmax. For example, a distance from which the low target speed Vt1 is calculated using equation 1 is represented as D1, and a distance from which the maximum target speed Vtmax is calculated using equation 1 is represented as D2. In this case, when the player touches the touch panel 15 inside a circular area of a radius D1 having the reference coordinates P0 at the center thereof, the target speed Vt is always set to zero. When the player touches the touch panel 15 outside a circular area of a radius D2 having the reference coordinates P0 at the center thereof, the target speed Vt is always set so as to have a value of the maximum target speed Vtmax. Further, in order to simplify a process of calculating the target speed Vt, the target speed Vt may be set to zero when the distance D<D1 is satisfied, and the target speed Vt may be set so as to have a value of the maximum target speed Vtmax when the distance D≧D2 is satisfied, so as to eliminate the calculation using equation 1.

Returning to FIG. 8, following step 54, in step 55, the CPU core 21 acquires the target angle θt (as shown in FIG. 6) between the position coordinates Ppc of the player character PC and the target position coordinates Pt in the game space coordinate system, and the target angle data D23 stored in the RAM 24 has its data updated to data representing the target angle θt having been acquired. The CPU core 21 determines in step 56 whether or not the player character PC is performing an action other than an action of moving to another position or determines in step 57 whether or not the player character PC is starting an action other than an action of moving to another position. For example, when the action flag data D26 has its data set to ON, the CPU core 21 determines that the player character PC is performing an action other than an action of moving to another position (Yes in step 56), and the CPU 21 advances the process to step 62. Further, when the contacting object has been set in step 52 and the player character PC satisfies a predetermined condition, the CPU core 21 determines that the player character PC is starting an action other than an action of moving to another position (Yes in step 57), and the action flag data D26 has its data set to ON. Then, the process is advanced to step 62. When the player character PC is not performing an action other than an action of moving to another position (No in step 56) or when the player character PC is not starting an action other than an action of moving to another position (No in step 57), the CPU core 21 advances the process to step 58.

Exemplary determinations criteria used in step 57 will be described. For example, when the contacting object is set to a non-player character that is within a conversation range or a call range set for the player character PC, the CPU core 21 determines that the player character PC is starting an action of talking with the non-player character or an action of calling the non-player character. When the contacting object is set to the player character PC, the CPU core 21 determines that the player character PC is starting an action of using an item held by the player character PC by pointing the item toward the direction in which the player character PC is currently facing. When the contacting object is set to an object OBJ, positioned within an action range, for which the player character PC will use an item held by the player character PC (for example, when the contacting object is set to a "tree" and the item is an ax), the CPU core 21 determines that the player character PC is starting an action on the object OBJ.

The CPU core 21 determines in step 58 whether or not a current movement speed of the player character PC represented by the movement speed data D24 has a value greater than a threshold value, and an angle differential between the target angle θt and the movement angle represented by the movement angle data D25 has a value greater than a threshold value. When the movement speed and the angle differential have values greater than the threshold values, respectively, the CPU core 21 sets the action flag data D26 to ON, and advances the process to step 62. On the other hand, when at least one of the movement speed and the angle differential have a value smaller than the threshold value, the CPU core 21 advances the process to step 59. For example, while the player character PC is moving in the game space at a speed having a value greater than the threshold value, the player instructs for a direction change of the movement (that is, the angle differential is great). In this case, the determination result in step 58 is "Yes" so as to cause the player character PC to perform an action other than a below-described action of moving to another position (for example, an action of causing the player character PC to slip).

In step 59, the CPU core 21 increases or reduces the movement speed of the player character PC by a predetermined value so as to approach the target speed Vt, and the movement speed data D24 stored in the RAM 24 has its data updated to data representing the target speed Vt. Next, in step 60, the CPU core 21 changes the movement angle of the player character PC by a predetermined value so as to approach the target angle θt, and the movement angle data D25 stored in the RAM 24 has its data updated to data representing the target angle θt. The CPU core 21 moves the player character PC in the game space using the movement speed and the movement angle having been updated in steps 59 and 60, respectively. In step 61, the position coordinate data D21 stored in the RAM 24 has its data updated to data representing the position to which the player character PC has been moved, and the process is advanced to step 65.

When any of the determination results of steps 56 to 58 is "Yes", the CPU core 21 performs an action process in step 62, and advances the process to the next step. The action process represents a process for causing the player character PC to perform a specific action other than an action of moving in the game space. The action process is performed based on a combination of the contacting object and the item held by the player character PC, a positional relationship between the contacting object and the player character PC, a specific movement instruction for the player character PC, and the like. For example, when the contacting object is a non-player character appearing in a predetermined range, the action is represented such that the player character PC talks with the non-player character or the player character PC calls the non-player character. When the contacting object is an object, appearing in a predetermined range, on which the player character PC will perform an action, the player character PC performs a predetermined action on the object (for example, the player character PC cuts a tree with an ax). Further, while the player character PC is moving in the game space at a speed having a value greater than a threshold value, the player instructs for a direction change of the movement. At this time, an action may be represented such that the movement speed of the player character PC is substantially reduced so as to cause the player character PC to slip.

Next, the CPU core 21 determines in step 63 whether or not the action being processed in step 62 has been completed. When the action has been completed, the CPU core 21 stops representing the action and sets the action flag data D26 to OFF in step 64, and advances the process to step 65. On the other hand, when it is determined in step 63 that the action is to be continued, the CPU core 21 advances the process directly to step 65.

In step 65, the CPU core 21 disposes rendering models in the game space in accordance with the position coordinates Ppc of the player character PC and the position coordinates of the respective objects, and renders the game image seen from the viewpoint of the virtual camera C. In step 65, the rendering models corresponding to the player character PC and other objects OBJs appearing in the game space are disposed in the game space so as to render the game image seen from the viewpoint of the virtual camera C. Next, the CPU core 21 determines whether or not the game is to be ended. The game is to be ended, for example, when a condition for a game over is satisfied (for example, when a purpose of the game is attained, or when the player character to be operated has retired), or when the player performs a manipulation for ending the game. When the game is to be continued, the CPU core 21 returns the process to step 51 and repeats the same game process. When the game is to be ended, the CPU core 21 ends the process according to the flow chart.

As described above, in the game process performed by the game apparatus 1, when the player character PC is moved in the virtual game space using the touch panel 15, the movement speed is set to a value based on the distance D between the reference coordinates P0 and the touch coordinates TP on the touch panel 15, and the movement angle is determined based on the coordinates (target position coordinates Pt), on the game field in the virtual game space, on which the touch coordinates TP on the touch panel 15 are superimposed. That is, the movement speed can be determined using the distance, in the touch panel coordinate system, which is not influenced by a shape or an inclination of the game field. Therefore, the player can touch the touch panel 15 at such a touch position (distance) as to move the player character PC over a desired distance, thereby obtaining a desired movement speed. For example, when the touch panel 15 is used so as to emulate an operation performed by a joy stick, the inclination (angle of inclination) of the joy stick is determined in accordance with a physical distance based on the operation performed on the touch panel 15, and a direction toward which the joy stick is inclined is determined in accordance with a position, in the game space, on which the touch position on the touch panel 15 is superimposed. Accordingly, while the player is directly designating, as a destination, a position in the game space on which a position touched on the touch panel 15 is superimposed, the player can control the movement speed so as to operate the player character PC, thereby preventing the player from feeling dissatisfied.

Although in the above description a game image is generated by a perspective-projection from the virtual camera C through the near clipping plane (touch panel 15) having the touch panel coordinate system set as shown in FIGS. 5 and 6, the game image may be generated using a parallel projection. Although in the above description the cylindrical drum field FD is used as a game field, a game field, such as a spherical game field, of a curved surface having a stereoscopic effect, or a game field including a plurality of planes each having a different inclination may be used. The present invention is also applicable to a game field of a single plane which is inclined with respect to the near clipping plane (the touch panel 15).

Moreover, in the above description, for making the description more specific, the coordinate transformation method is described by setting a specific coordinate axis, and the game process is described by indicating a specific shape of the game field, and the like. However, it should be understood that they are merely examples and the present invention is not restricted to the method and the shape described above.

Further, in the aforementioned embodiment, as an example of the liquid crystal display section having two screens, described is a case where the first LCD 11 and the second LCD 12, which are physically separated from each other, are disposed one on top of the other, that is, the liquid crystal display section has the upper screen and the lower screen. However, the display screen may have another structure if the display screen is composed of two screens. For example, the first LCD 11 and the second LCD 12 may be aligned side-by-side on one principal surface of the lower housing 13b. Further, a vertically longer LCD, which has the same width as the second LCD 12 and twice the length of the second LCD 12 (that is, the LCD is a physically single LCD but has a size of two display screens), may be disposed on one principal surface of the lower housing 13b so as to display the first and the second game images one on top of the other (that is, the first and the second game images are displayed one on top of the other with no boundary portion being provided). Moreover, a horizontally longer LCD, which has the same length as the second LCD 12 and twice the width of the second LCD 12, may be disposed on one principal surface of the lower housing 13b so as to display the first and the second game images side-by-side (that is, the first and the second game images may be side-by-side displayed adjacent to each other with no boundary portion being provided). That is, a physically single screen may be divided in two screens so as to display the first and the second game images, respectively. In any of the aforementioned methods for displaying the game images, the touch panel 15 is disposed on the screen on which the second game image is displayed, thereby enabling the present invention to be similarly realized. Furthermore, in a case where the physically single screen is divided into two screens so as to display the first and the second game images, respectively, the touch panel 15 may be disposed all over the whole screen (so as to cover two screens).

In addition, in the aforementioned embodiment, the touch panel 15 is integrated into the game apparatus 1. Needless to say, however, also when the game apparatus and the touch panel are separately provided, the present invention can be realized. Further, the touch panel 15 may be provided on the upper principal surface of the first LCD 11. Furthermore, although in the aforementioned embodiment two display screens (that is, the first LCD 11 and the second LCD 12) are provided, the number of display screens provided can be one. That is, in the aforementioned embodiment, it is also possible to provide only the second LCD 12 as a display screen and the touch panel 15 thereon without the first LCD 11 being provided. In addition, in the aforementioned embodiment, the second LCD 12 is not provided and the touch panel 15 may be provided on the upper surface of the first LCD 11.

Although in the aforementioned embodiment a touch panel is used as an input means for the game apparatus 1, another pointing device may be used. Here, the pointing device is an input device for designating an input position or coordinates on a screen. The present invention is also applicable to an information processing apparatus using, for example, a mouse, a track pad, and a track ball as an input means The storage medium having stored thereon the game program and the game apparatus according to the present invention allows a player to perform an operation using a pointing device without feeling dissatisfied, and are useful as an information processing apparatus for representing a game image and the like using various game fields, and as a program and the like executed by the information processing apparatus.

While the invention has been described in detail, the foregoing description is in all aspects illustrative and not restrictive. It is understood that numerous other modifications and variations can be devised without departing from the scope of the invention.

What is claimed is:

1. A non-transitory storage medium having stored thereon a game program to be executed by a computer of a game apparatus which displays on a display screen a game image representing at least a portion of a virtual game space, and which is operated using a pointing device for detecting for a position, on the display screen, designated by a player, the game program causing the computer to execute:
   acquiring designated coordinates, on the display screen, designated by the pointing device;
   calculating target coordinates, in the virtual game space, corresponding to the designated coordinates;
   calculating a distance from reference coordinates set on the display screen to the designated coordinates;
   calculating speed information using the distance; and
   moving a predetermined object toward the target coordinates in the virtual game space at a movement speed represented by the speed information.

2. The non-transitory storage medium having the game program stored thereon according to claim 1, wherein the game program causes the computer to further execute setting, as the reference coordinates, a position, on the display screen, which is superimposed on a position at which an object to be operated by the player is displayed.

3. The non-transitory storage medium having the game program stored thereon according to claim 1, wherein a position of the reference coordinates is fixed as a center position of the display screen.

4. The non-transitory storage medium having the game program stored thereon according to claim 1, wherein a position which is on a game field set in the virtual game space and on which the designated coordinates on the display screen are superimposed is calculated as target coordinates.

5. The non-transitory storage medium having the game program stored thereon according to claim 1, wherein a target speed of the object, using a predetermined function, is calculated as the speed information calculated from the distance.

6. The non-transitory storage medium having the game program stored thereon according to claim 5, wherein the target speed corresponding to the distance having a value greater than a first threshold value is set so as to have a constant value of a maximum target speed.

7. The non-transitory storage medium having the game program stored thereon according to claim 5, wherein the target speed is set to zero when the distance has a value smaller than a second threshold value.

8. The non-transitory storage medium having the game program stored thereon according to claim 1, wherein the pointing device is a touch panel attached to the display screen.

9. A game apparatus which displays on a display screen a game image representing at least a portion of a virtual game space, and which is operated using a pointing device for detecting for a position, on the display screen, designated by a player, the game apparatus comprising:
   a processor;
   a memory coupled to said processor, said memory storing instructions that, when executed by said processor, control said processor to:
   acquire designated coordinates, on the display screen, designated by the pointing device;
   calculate target coordinates, in the virtual game space, corresponding to the designated coordinates;
   calculate a distance from reference coordinates set on the display screen to the designated coordinates;
   calculate speed information using the distance; and
   move a predetermined object toward the target coordinates in the virtual game space at a movement speed represented by the speed information.

10. The game apparatus according to claim 9, wherein said processor is further controlled to set, as the reference coordinates, a position, on the display screen, which is superimposed on a position at which an object to be operated by the player is displayed.

11. The game apparatus according to claim 9, wherein a position of the reference coordinates is fixed as a center position of the display screen.

12. The game apparatus according to claim 9, wherein, as the target coordinates, a position which is on a game field set in the virtual game space and on which the designated coordinates on the display screen are superimposed.

13. The game apparatus according to claim 9, wherein a target speed of the object is calculated, using a predetermined function, as the speed information calculated from the distance.

14. The game apparatus according to claim 13, wherein the target speed corresponding to the distance having a value greater than a first threshold value is set so as to have a constant value of a maximum target speed.

15. The game apparatus according to claim 13, wherein, when the distance has a value smaller than a second threshold value, the target speed is set to zero.

16. The game apparatus according to claim 9, wherein the pointing device is a touch panel attached to the display screen.

17. A method of controlling a game apparatus which displays on a display screen a game image representing at least a portion of a virtual game space, and which is operated using a pointing device for detecting for a position, on the display screen, designated by a player, comprising:
   acquiring designated coordinates, on the display screen, designated by the pointing device;
   calculating target coordinates, in the virtual game space, corresponding to the designated coordinates;
   calculating a distance from reference coordinates set on the display screen to the designated coordinates;
   calculating speed information using the distance; and moving a predetermined object toward the target coordinates in the virtual game space at a movement speed represented by the speed information.

18. A game system which displays on a display screen a game image representing at least a portion of a virtual game space, and which is operated using a pointing device for detecting for a position, on the display screen, designated by a player, the game system comprising:

a processor;

a memory coupled to said processor, said memory storing instructions that, when executed by said processor, control said processor to:

acquire designated coordinates, on the display screen, designated by the pointing device;

calculate target coordinates, in the virtual game space, corresponding to the designated coordinates;

calculate a distance from reference coordinates set on the display screen to the designated coordinates;

calculate speed information using the distance; and move a predetermined object toward the target coordinates in the virtual game space at a movement speed represented by the speed information.

* * * * *